United States Patent [19]

Laycock et al.

[11] Patent Number: 5,509,009
[45] Date of Patent: Apr. 16, 1996

[54] VIDEO AND AURAL COMMUNICATIONS SYSTEM

[75] Inventors: John Laycock, Alton; Michael W. Thomas, Bracknell, both of United Kingdom

[73] Assignee: Northern Telecom Limited, Montreal, Canada

[21] Appl. No.: 65,171

[22] Filed: May 20, 1993

[30] Foreign Application Priority Data

May 20, 1992 [GB] United Kingdom ............... 9210703

[51] Int. Cl.$^6$ ............................................. H04L 12/18
[52] U.S. Cl. ..................... 370/62; 370/110.1; 348/15; 379/202
[58] Field of Search ................................. 370/110.1, 62, 370/94.1, 94.2, 79; 379/202, 54, 53, 206, 158; 358/85, 86; 455/5.1; 348/15, 16, 10, 705

[56] References Cited

U.S. PATENT DOCUMENTS

| | | | |
|---|---|---|---|
| 4,650,929 | 3/1987 | Boerger et al. | 379/54 |
| 4,715,059 | 12/1987 | Cooper-Hart et al. | 379/53 |
| 4,847,829 | 7/1989 | Tompkins et al. | 370/62 |
| 4,953,196 | 8/1990 | Ishikawa et al. | 379/53 |
| 4,961,211 | 10/1990 | Tsugane et al. | 379/54 |
| 4,980,761 | 12/1990 | Natori | 379/202 |
| 4,995,071 | 2/1991 | Weber et al. | 379/54 |
| 5,036,390 | 7/1991 | Masunaga | 358/85 |
| 5,040,177 | 8/1991 | Martin et al. | 370/110.1 |
| 5,157,715 | 10/1992 | Fischer et al. | 379/53 |
| 5,315,633 | 5/1994 | Champu | 379/202 |

FOREIGN PATENT DOCUMENTS

| | | |
|---|---|---|
| 456248 | 5/1991 | European Pat. Off. . |
| 790180 | 5/1955 | United Kingdom . |
| 2206767 | 6/1988 | United Kingdom . |

OTHER PUBLICATIONS

GLOBECOM'85, IEEE, Global Telecommunications Conference vol. 3, 5 Dec. 1985, New Orleans pp. 1206–1211 K. Ohno et al. 'Digital Colour TV Multiplexing Equipment'.
Review of the Electrical Communication Laboratories vol. 33, No. 4, 1985, Tokyo JP pp. 647–655 K. Sawada et al 'Multipoint Video Teleconferencing'.
Philips Telecommunication Review vol. 47, No. 2 Jun. 1989, Hilversum NL pp. 20–35, XP00054482 N. Hahn 'Video Conferencing'.
NEC Research and Development No. 96, Mar. 1990, Tokyo JP pp. 13–29, XP000136294 T. So et al. 'C&C Systems Infrastructure'.
Electronics and Communication Engineering Journal vol. 3, No. 1, Feb. 1991, London GB pp. 4–12 XP000208832 P. T. Kirstein 'Experiences with the University of London Interactive Video Education Network'.

(List continued on next page.)

*Primary Examiner*—Wellington Chin
*Assistant Examiner*—Ajit Patel
*Attorney, Agent, or Firm*—Lee, Mann, Smith, McWilliams, Sweeney & Ohlson

[57] ABSTRACT

A dial-up aural and visual communication system includes a telecommunication network with a switch connected thereto, a codec subsystem connected to the switch and video equipment connected to the switch via the codec subsystem with voice communication equipment connected directly to the switch. The codec subsystem is shared between several end users and can be located near the switch. Sharing the codec reduces cost and amount of equipment at end users desk. The codec subsystem can also switch video, including composite video, between local lines and can include frame and image storage. The codec can transmit at 9.6 kbps, p×64 kbps, and via ISDN. The system can be used for video conferencing, remote surveillance or desk-top services, and can include an image grooming system. Images may be stored in switch facilities traditionally used for voice mail.

10 Claims, 13 Drawing Sheets

OTHER PUBLICATIONS

1974 IEEE Intercon Technical Program Papers 29 Mar. 1974, New York City pp. 1–6 N. O. Johannesson 'Design Considerations for a Picture Telephone Set'.

Fernseh– und Kino–Technik vol. 29, No. 1 Jan. 1975, Munchen pp. 5–9 G. Brand 'Experimentelle Studie für ein Farbildtelefonsystem'.

Review of the Electrical Communication Laboratories vol. 33 No. 4 1985, Tokyo JP pp. 563–571 S. Hashimoto 'Broadband Communication System'.

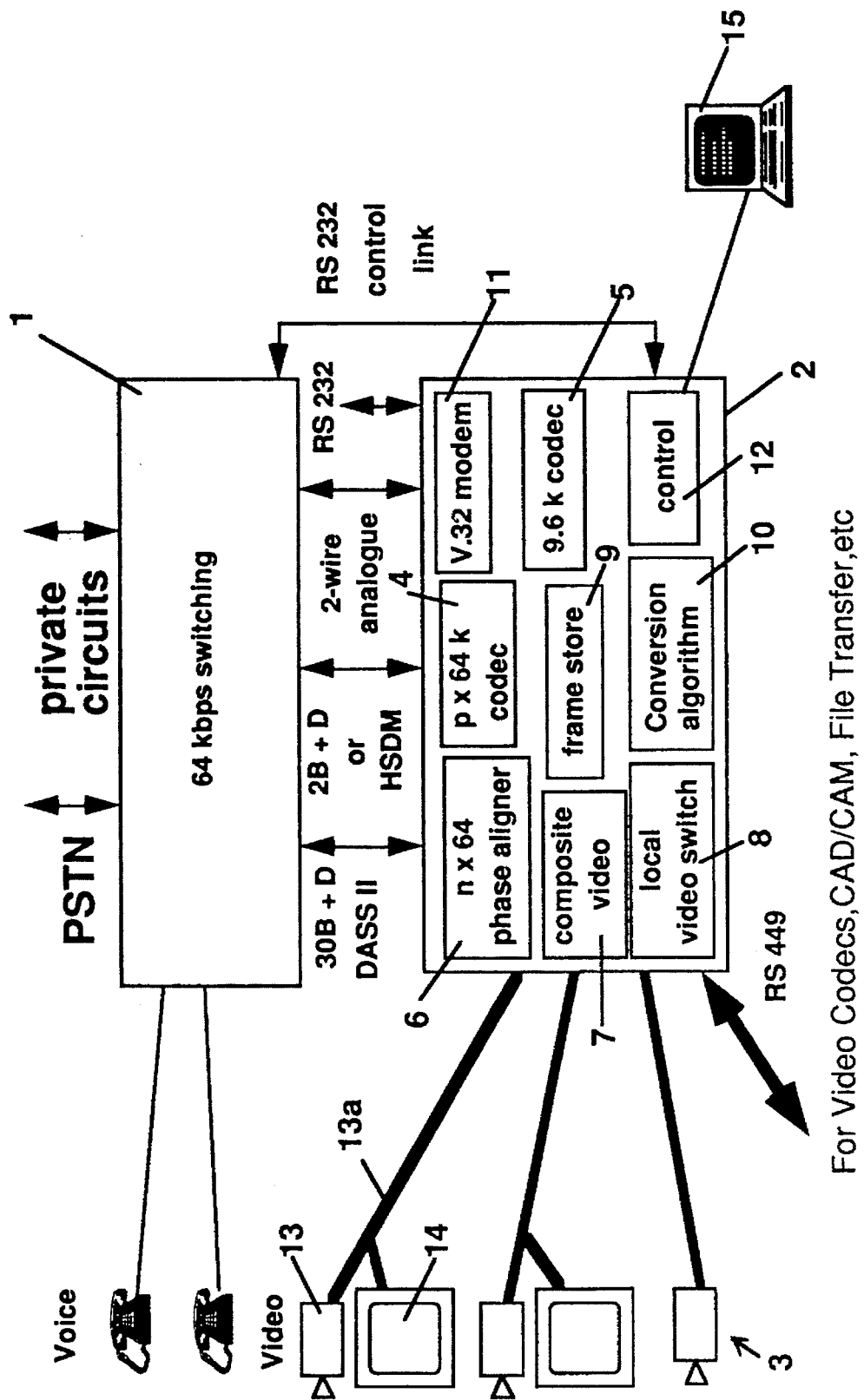

stand alone feeder fully integrated system

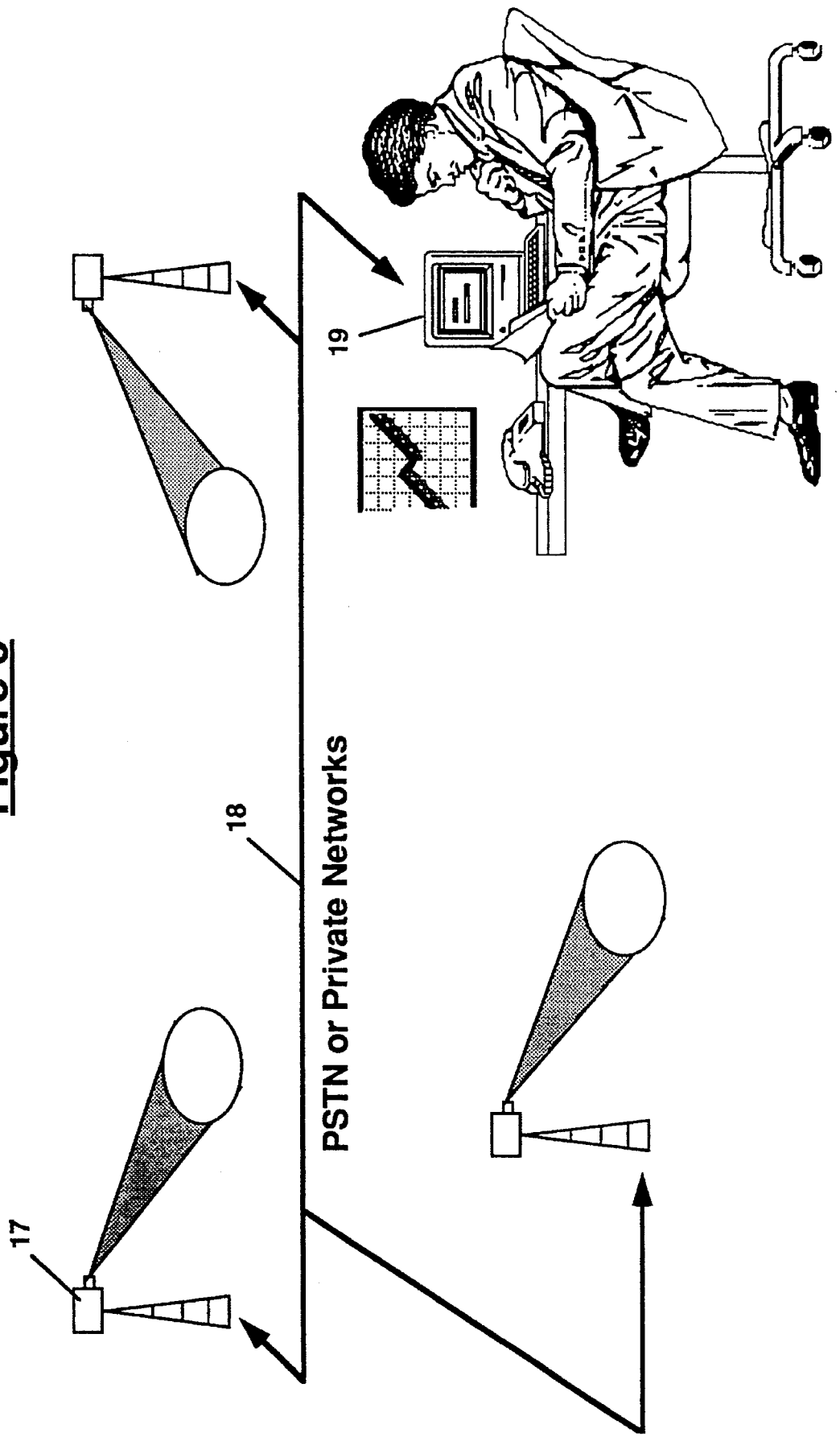

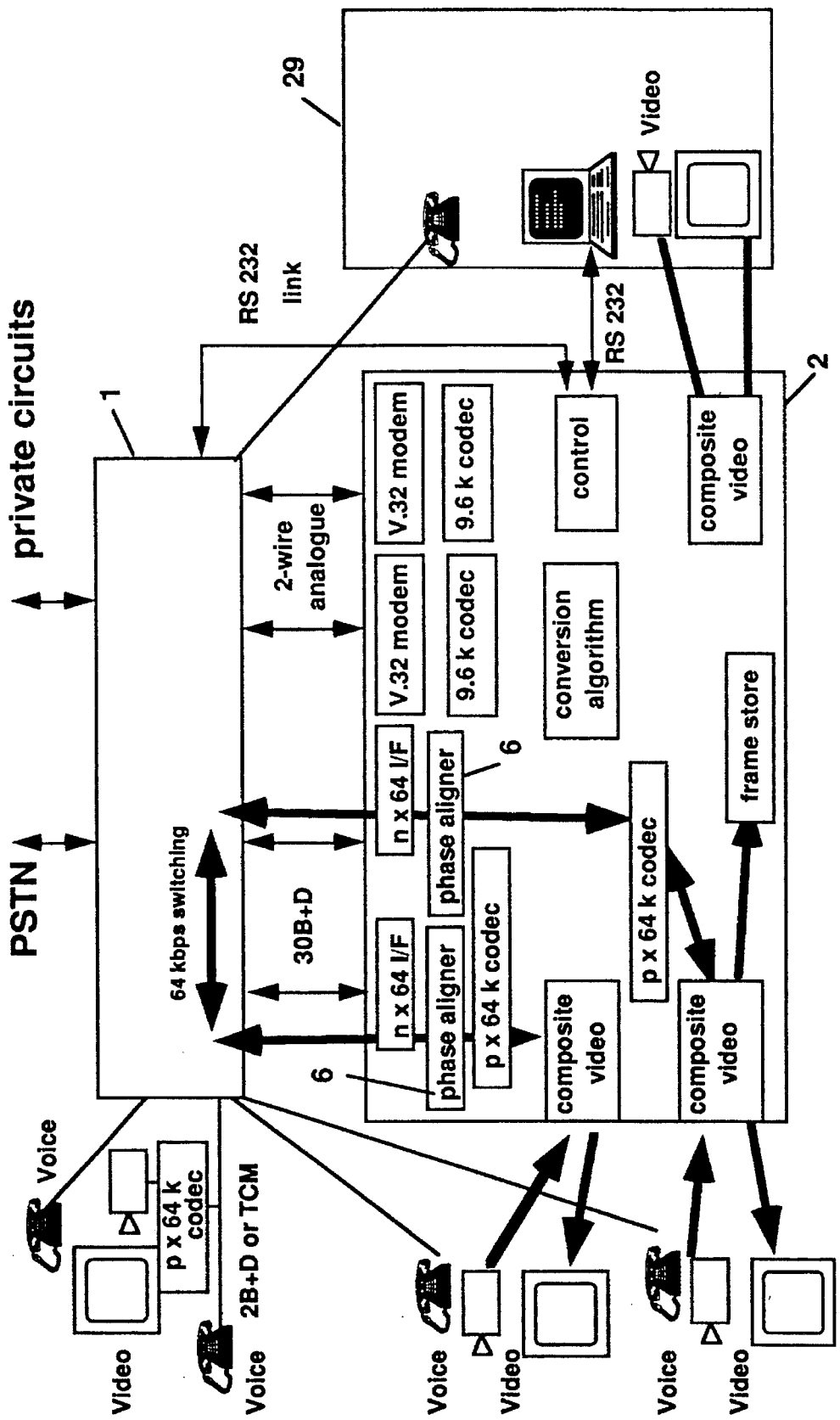

VIDEO AND AURAL COMMUNICATIONS SYSTEM

BACKGROUND OF THE INVENTION

This invention relates to video services, for example, videoconferencing, video multimedia remote surveillance.

The videoconferencing market, that is face-to-face discussions by means of real time, bidirectional transmission of image and sounds across transmission media, is increasing. Most of the existing equipment to support the above application require relatively high bandwidth transmission links, which are usually point-to-point. More recently the technology to support videoconferencing has concentrated on providing dial-up services, and this has required the development of codecs of lower bandwidth and operating on single or multiple 64 (or 56) kbps transmission lines. In all instances, the codec equipment is positioned proximal to the actual end-user, such as being part of desk-top telephony equipment, permitting the analogue audio and video signals to be converted locally into digital signals for onward transmission across the telecommunications network. This however means that costly codec equipment is required for each subscriber (end-user).

SUMMARY OF THE INVENTION

According to one aspect of the present invention there is provided a dial-up aural and visual communication system including a telecommunications network, a telecommunications switch connected to the network and a codec subsystem located at the switch and connected to the switch, voice communication equipment of end users associated with the switch being connected directly to the switch and video equipment of end users associated with the switch being connectable to the switch via the codec subsystem, the codec subsystem being shared between the end users and being in the form of a video line-card for the switch.

According to another aspect of the present invention there is provided a codec subsystem for use with a dial-up aural and visual communications system according to the preceding paragraph, the codec subsystem including one or more codecs, composite video input/output means and means for controlling the operation of the subsystem.

BRIEF DESCRIPTION OF THE DRAWINGS

Embodiments of the invention will now be described with reference to the accompanying drawings, in which FIG. 1 is a functional diagram of the inventive arrangement;

FIGS. 3, 4 and 5 illustrate basic surveillance applications;

FIG. 13 illustrates an n×64 switching service.

DESCRIPTION OF THE PREFERRED EMBODIMENTS

Figure 2A:
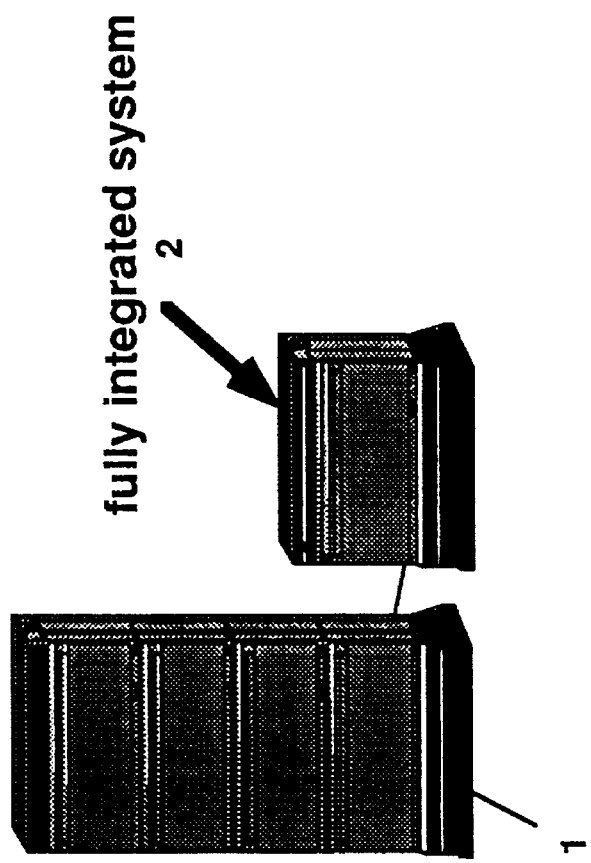
FIGS. 2a and 2b illustrate two possible system configurations.

Individuals would like to be able to receive dynamic video and audio information from remote locations in order to facilitate rapid communication. The communication may take one of several forms, such as:

- face-to-face discussions as achieved with traditional videoconferencing;
- real-time discussion of modest resolution graphic images, including annotating the source material in real time;
- transmission of high resolution graphic images followed by discussion;
- transmission of high resolution graphic images for off-line inspection;
- real-time discussion of solid objects, including pointing out key features;
- transmission of high resolution images of solid objects for off-line inspection;
- real-time observation of within-building movements;
- real-time observation of outside world events.

For a large number of potential end-users of image transmission systems, facilities have not previously been cost effective, because of the costs involved with specialised site cabling and the tariffs for high bandwidth trunk traffic. Furthermore, until recently the inability to dial-up connections over existing networks has severely limited the widespread use of existing commercially available systems.

The quality of service required may vary from application to application. In certain instances the speed of data transfer (and hence image update rate) is not of paramount importance, as long as high resolution image and/or audio are achieved. In other instances, speed is of the essence but resolution is not crucial. The most demanding applications, however, require both high speed and high resolution. To achieve these options, it is not a prerequisite that a fixed high bandwidth communication link be in place between all end users. The ability to vary the bandwidth link to match both the service requirement and permissible costs, enables a more cost-effective solution to be put in place and allows more users to gain access to image-based services.

It is thus proposed to provide a so-called codec pool or codec subsystem interfaced to a telephone switch (PBX) in order to permit images to be transmitted across the networks accessed by the switch. By the expression codec pool (codec subsystem) is to be understood an arrangement of elements including codecs, which may be capable of dealing with various different signal rates or a number of the same rates, whereby flexibility in the service offered is available. Furthermore, by closely coupling the codec subsystem to the switch, rather than arranging it adjacent to the subscribers terminals (end-users), the scheduling, control and value-added features supported by the switch can be utilised by the end-user to obtain a higher level of service. Furthermore, by sharing the codecs (codec subsystem) across a number of end-users (PBX subscribers) a cost-effective commercial solution results.

FIG. 1 is a functional diagram of the proposed arrangement and the end users. It basically comprises a conventional for example, PBX, network switch 1 capable of 64 kbps switching which is shown interfacing to both private circuits and the public switched telephoned network (PSTN). The switch 1 is shown supporting voice facilities in a conventional manner, however, in addition numerous additional links are indicated in order to permit the switch to support image services. These links are between the switch 1 and the codec subsystem 2 and between the codec subsystem 2 and various video systems 3 consisting of TV cameras with or without associated viewing screens or monitors.

The codec subsystem 2 is shown as incorporating a number of elements: a p×64 k codec 4, a 9.6 k codec 5, an n×64 phase aligner 6, a composite video input 7, a local video switch 8, a frame store 9, a conversion algorithm 10, a V.32 modem 11 and a control unit 12. Quite which elements are present for a particular application are determined by that application, as will be apparent from the following description. The codec subsystem is connected to the video end user 3 having cameras 13 and screens 14 via, for example, coaxial cables or twisted pair cables 13a. The RS449 link is provided for interconnections for video codecs, CAD/CAM, file transfer etc. The illustrated links between the codec subsystem 2 and the network switch 1 include 30 B+D lines supporting DASS 11, 2B+D links or HSDM (High Speed Data Module), 2-wire analogue lines and RS232 links. Furthermore there is an RS232 control link between the control unit 12 and the network switch 1. Overall coordination of the two subsystems (switch 1 and codec pool 2) is achieved by the RS232 control link and the control process within the codec subsystem 2. The computer terminal 15 may be used to control the codec subsystem to operate as required and to achieve other operations as will be apparent from the following.

The codec subsystem 2 includes the various elements referred to above in order to be able to provide a number of services for a number of different types of end users. As mentioned above, the codec subsystem 2 is disposed adjacent to the network switch 1 and may be considered as being in the form of a video line card for the switch. Such a video line card can be placed alongside an existing switch and interconnected to it.

It is not necessary that the transmission rate is the same for each end-user, in fact the codec subsystem specifically covers use at a number of transmission rates from a basic 9.6 kbps rate up to p × 64 kbps (p for example being 6). High bandwidth conferencing conventionally runs at 384 kbps or up to 2 Mbps and there are special products of 40 Mbps. For a basic system making calls over the PSTN, there is required a 9.6 k codec 5 together with a V.32 modem 11 and a 2-wire analogue link, and a control unit 12, which comprises local software to control the transaction which is installed under the control of the terminal 15. The control software may also be influenced by the RS232 control (computer) link. A higher bandwidth service makes use of the p×64 k codec and the 2B+D or HSDM link or the 30 B+D (DASS II) ISDN link, to the network switch. Multiples of 64 kbps circuits can be selected as desired, 2, 3, 4 etc. For such multiple cases it cannot be guaranteed that they will all be subject to the same transmission delays since they may be transmitted over different routes. Hence for such applications the n×64 phase aligner is required for use at the "receiver" end of the system to line up the arriving data. For a particular call n and p will be the same.

As will be appreciated dynamic images are input live to the codec subsystem. They are input as composite video signals to the composite video input 7 and will in general be subject to compression in a codec before transmission via the switch 1 to the external network (PSTN or private as illustrated). However, if required a sample video single frame can be stored in frame store 9, in compressed or uncompressed form. If compressed an image actually requires less storage space than a voice message and use could be made of a voice message transmission and storage system for transmitting and retaining such stored images.

A further element indicated in the codec subsystem is the local video switch 8. By means of this, video transactions between a number of end-users on the site served by the codec subsystem 2/switch 1 can be performed without the need for compression i.e. high bandwidth messages can be sent between local end users. The final element indicated in the codec subsystem is the conversion algorithm 10, whose function will be apparent from the following. A conventional video conferencing system operates at 2×6 kbps. Whilst it is possible for a 9.6 kbps end user to become part of such a conference, the conventional system only operates in such a manner as to downgrade all images to the bandwidth of the lowest contributor i.e. to 9.6 kbps in this example. The conversion algorithm in the present case can, however, also operate in order to bring a 9.6 kbps transmission up to the level of the other conference participants in order not to downgrade their images. This can be achieved by, for example, painting every picture point more than once. Hence the conversion algorithm may operate to convert image transmission from one bandwidth to a higher or a lower bandwidth.

The image services which the switch 1 is able to support include the following:

the switching of broadband video communication over lines local to the switch by directing composite video signals input to element 7 by means of the local video switch 8;

the storage of composite video images input via element 7 in the frame store 9;

the transmission of switching of compressed composite video images at 9.6 kbps over both 2 wire analogue circuits and RS232 links by means of the 9.6 kbps codec 5 and V.32 modem 11;

the transmission and switching of compressed composite video signals over both 2 B+D lines and HSDM by means of the p×64 kbps codec 4;

the transmission and switching of compressed composite video signals over part or all of the 30 B+D lines supporting DASS 11, by means of the p×64 kbps codec 4 and the n×64 kbps phase aligner unit 6;

the conversion of image transmissions from one bandwidth to a higher or lower bandwith via conversion algorithm 10 and, as a result of the latter, the optimisation of the number of grey levels in the image to achieve the optimum relationship between image quality and frame update rate.

All of these image services can be achieved with or without concurrent audio communications As the codec subsystem 2 is closely coupled to the network switch 1, the plethora of facilities available on the switch become available to support image transactions as well as voice transactions e.g. camp on, redirect call etc. but equally important is the ability to store images in switch facilities traditionally employed to support voice mail. By way of example only, the switch 1 may be comprised by the Applicants' Meridian 1 (Registered Trade Mark) product, the RS232 link by a Meridian Link and the frame store by Meridian Mail.

It will be apparent that the number of possible configurations of the basic system of FIG. 1 and the ways in which the resulting features may be exploited are numerous.

In the following, examples of possible configuration options and the types of services supported will be described.

The codec subsystem 2 is preferably of a modular nature and this permits numerous codecs to be installed within a subsystem chassis. Depending upon the services to be provided and the number of end-users to be supported, the chassis may, as mentioned already, be populated with multiple codecs of similar bandwidth e.g. all 9.6 kbps, or a mixture of codecs offering 9.6 kbps and px64 kbps services. As a consequence of this, the network switch may be served by either 9.6 kbps or 64 kbps network links, as is evident from FIG. 1 and the above description. It is not a prerequisite that the conversion algorithms 10 and frame store 9 facilities be installed within the chassis, neither is the local video switch necessarily so installed.

Figure 2B:
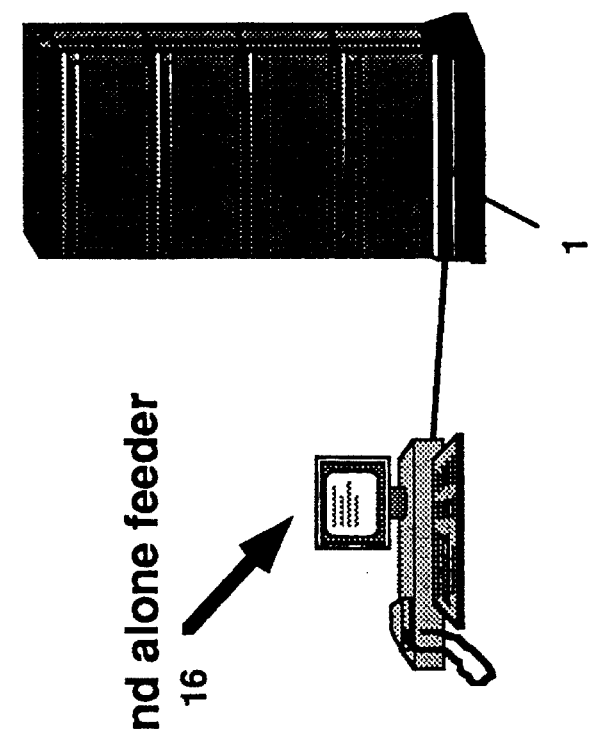

The nature of the codec subsystem 2 chassis may also vary depending upon whether it is intended to be positioned proximal or distal to the network switch 1. FIGS. 2a and 2b indicate two possible configurations. In FIG. 2a, a small stand alone feeder subsystem 16 is shown in which a minimum number of codecs are installed to permit a small number of end-users (not shown) all of which interface to the feeder to access local image services but also enabling a gateway to exist to the network switch 1. In FIG. 2b is illustrated a fully integrated system in which all end-user lines (not shown) are brought to a central network switch 1 and the associated codec subsystem 2. In all cases the codec subsystem is not positioned at the end user, rather it is spaced apart from them and adjacent, relatively speaking, to the switch so that the codec subsystem is shared between end users.

Figure 4:
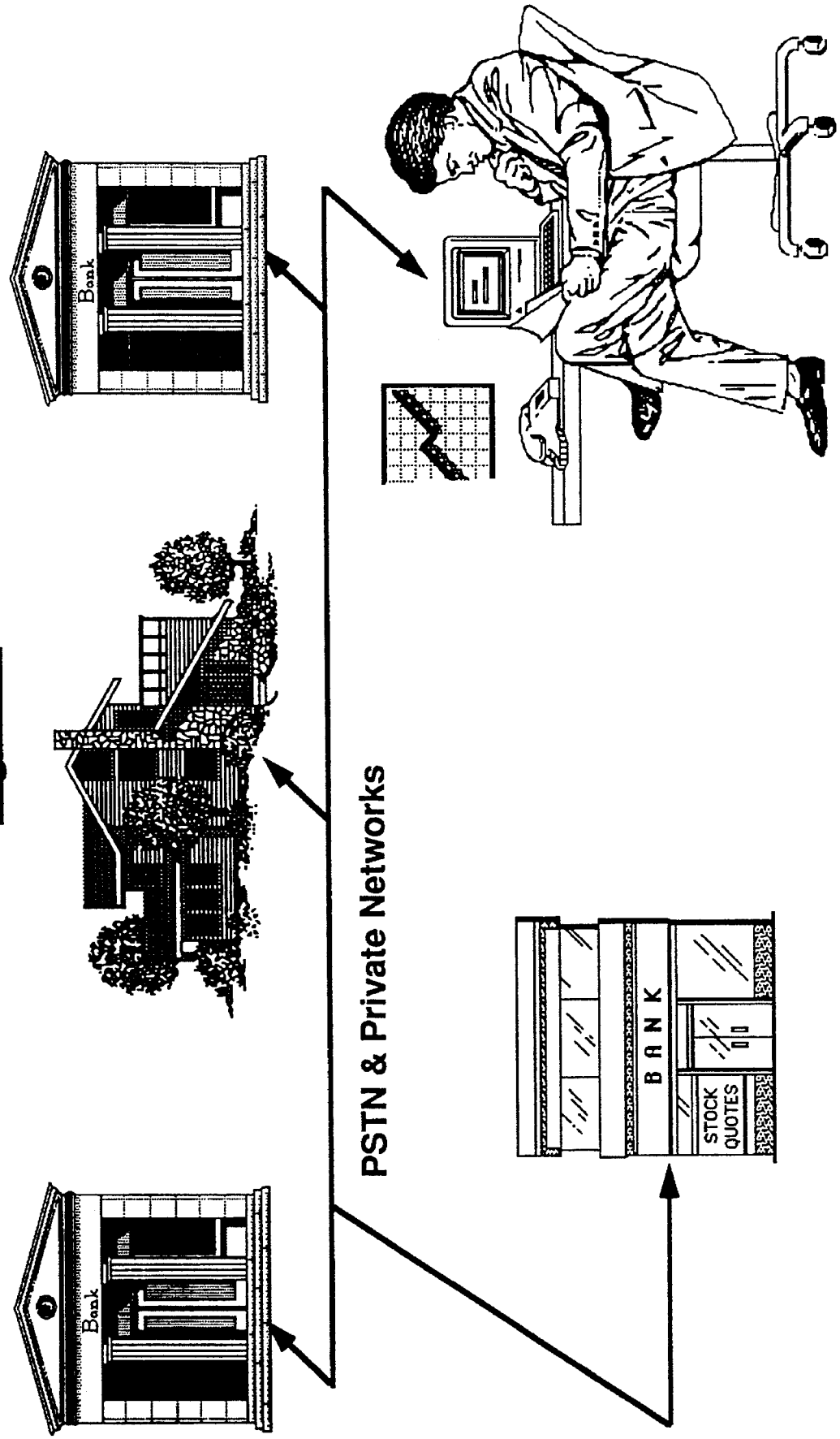
Figure 5:
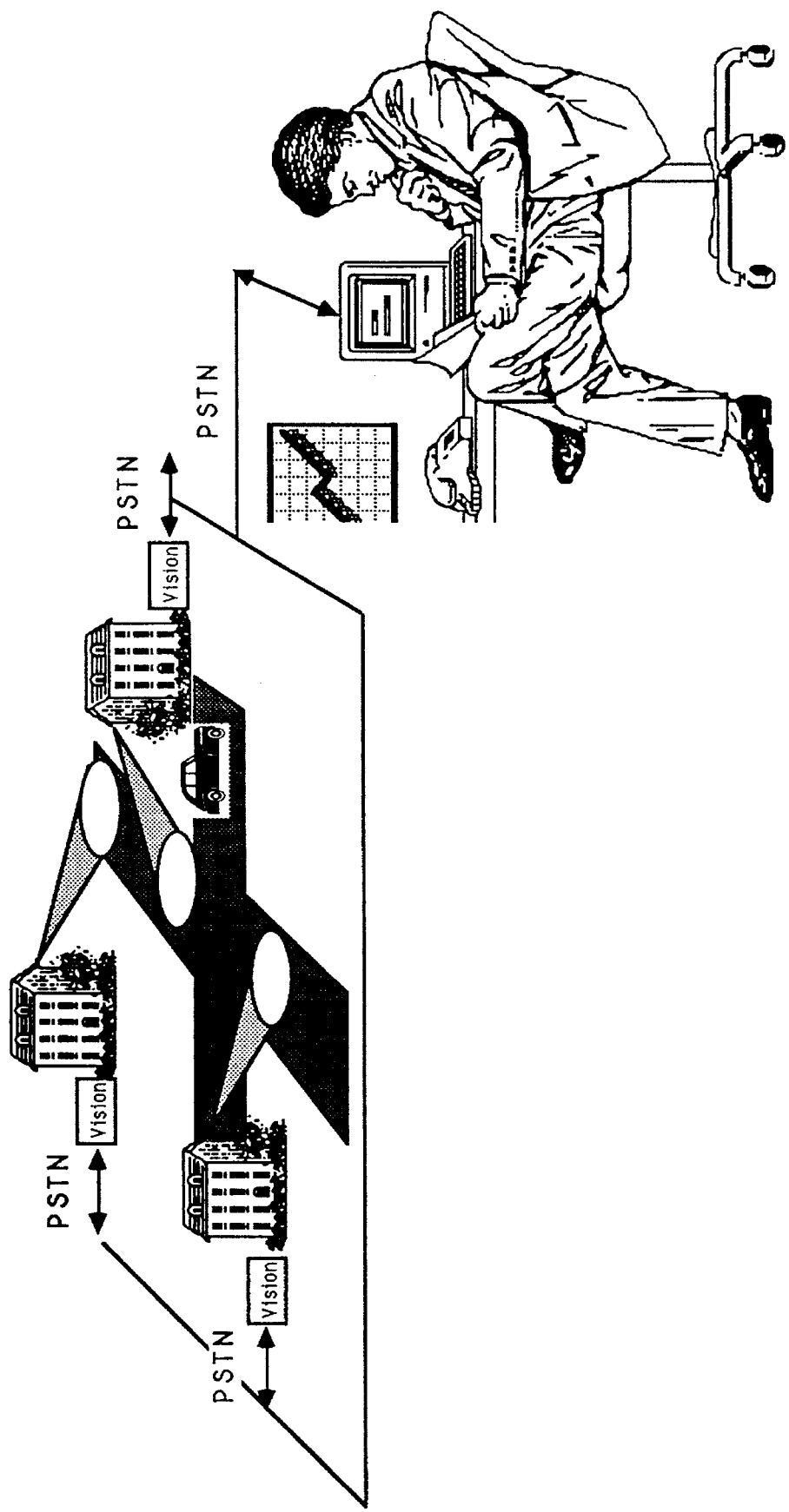

FIG. 3 illustrates a remote surveillance application in which the standalone feeder system of FIG. 2a is employed. In this configuration one or more (one as shown) remote cameras 17 are attached to a respective standalone feeder subsystem thereat (not shown). The feeder subsystems are, in turn, connected to network 18 to enable images to be backhauled to a central monitoring station 19. The major surveillance applications (building and traffic) are exemplified in FIGS. 4 and 5. Within these figures PSTN connections are indicated, however n×64 kbps connections are equally applicable if a higher level of image service is required.

Figure 6:
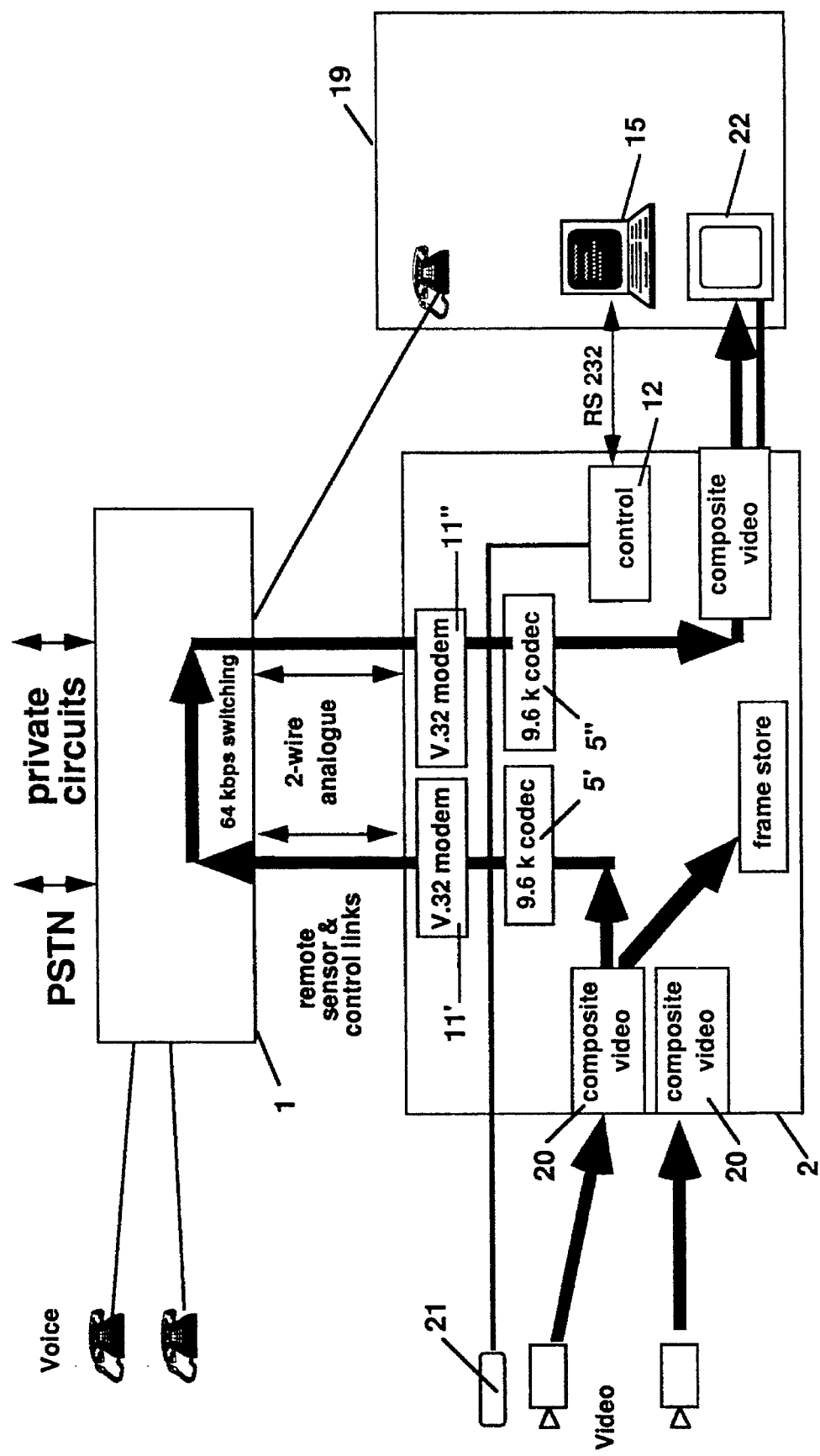
FIG. 6 illustrates networked surveillance services.

FIG. 6 considers the local provision of surveillance services via a fully integrated codec system (FIG. 2b). The various composite video images enter the codec subsystem 2 via respective inputs 20 together with a feed from an event sensor 21, which latter may be used to gate the control unit 12 and initiate the transmission of the compressed images in response to the occurrence of an event. The transmissions are shown leaving the codec subsystem 2 via the 9.6 kbps codec 5' and the V.32 modem 11' and entering the switch 1. The right hand side of the figure shows the complementary process in which transmissions from the network (PSTN or private circuit) in the case of remote private network surveillance arrive at the network switch 1. These are passed to the codec subsystem 2 via V.32 modem 11" and 9.6 kbps codec 5" before being displayed on the monitor 22 of the central monitoring station 19. Control of the overall codec subsystem 2 may be influenced via the indicated RS232 interface by the computer terminal 15 of the central monitoring station 19. By this facility remote control of distant cameras and associated equipment may be achieved. As will be appreciated from FIGS. 3 to 6 and the above description, the arrangement of equipment permits remote private network surveillance; local surveillance with the 9.6 kbps data being switched by the network switch; a codec system which is standalone or integrated; and a 9.6 kbps video codec and V.32 modem pool.

Although remote video surveillance has been exemplified by the two most common applications of building and traffic monitoring, the architecture described is capable of supporting any surveillance application in which camera signals in CCITT format can be coupled to the codec subsystem.

Figure 7:
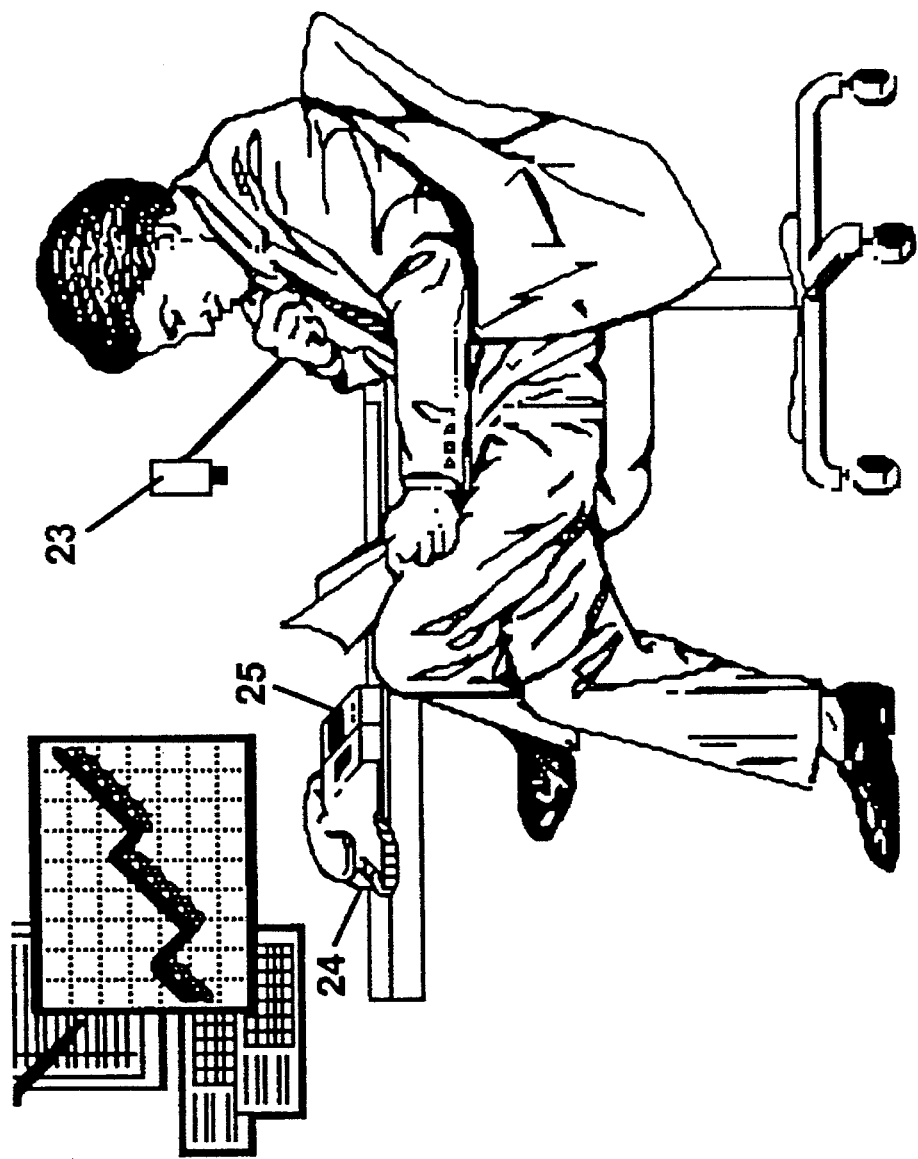
FIG. 7 illustrates a basic desk-top application.

FIG. 7 provides a basic example of a desk-top application. The end-user seated at his desk is provided with a local, small video camera 23 which is supported above the desk. The camera may be positioned to survey the desk-top or to be rotated to image the end-user's face or the contents/ occupants of the room. Alongside the telephone 24, which may be a handsfree telephone handset, is positioned a small video display or monitor 25. Alternatively a PC VGA (Video Graphics Array) terminal (not shown) may be employed for the display or monitor. The camera 23 is used to transmit images from the office, whereas the monitor receives incoming images generated at a distant location. As will be appreciated any CCITT compatible camera/monitor may be used.

Figure 8:
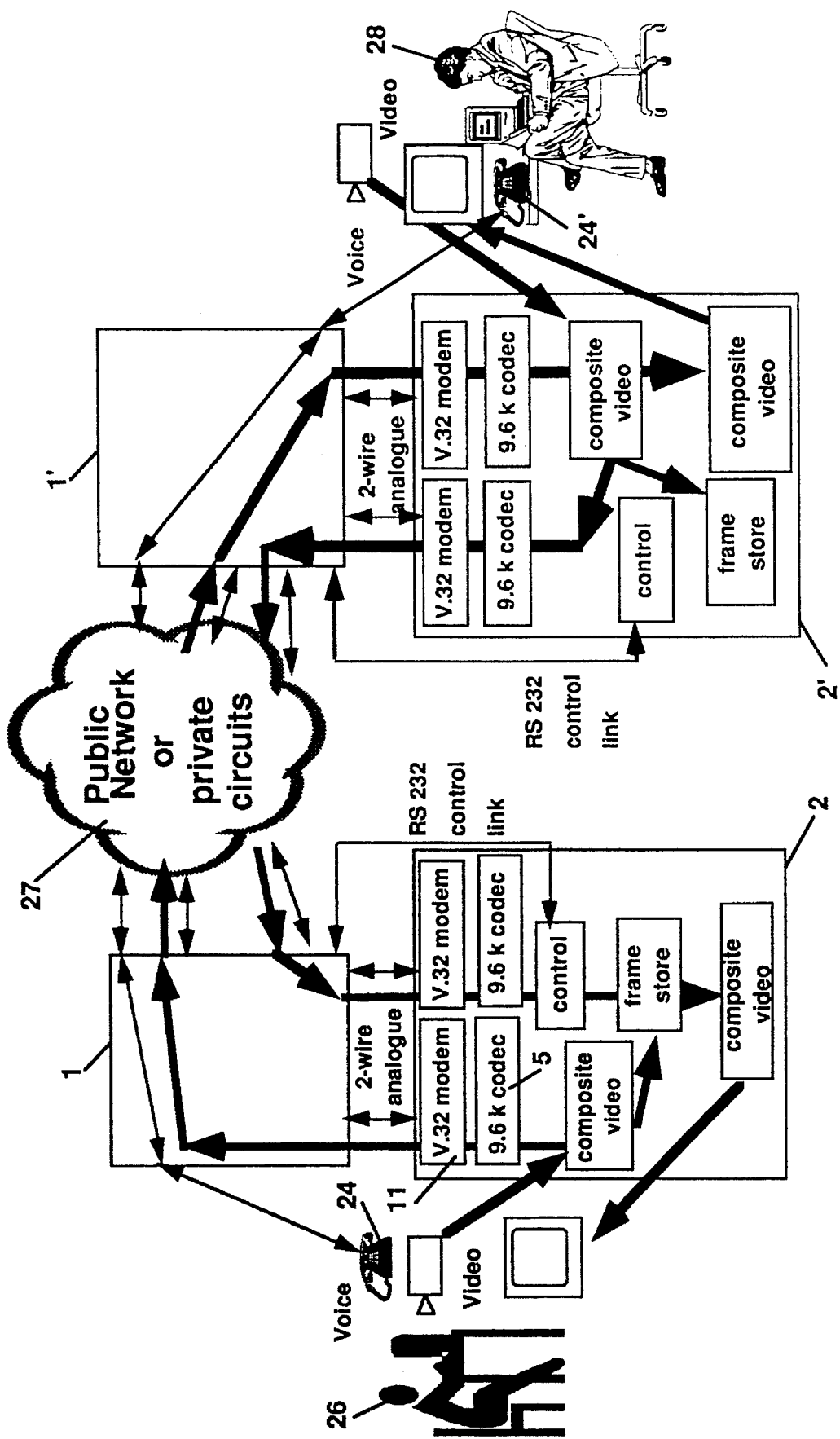
FIG. 8 illustrates the desk-top service application in greater detail.

FIG. 8 details the underlying system architecture to support the basic desk-top service of FIG. 7. Each telephone handset 24, 24' acts as the essential man machine interface to establish the routing and control for both the audio and image components of a transmission. Each element (audio and image) of a call requires its own line and these are correlated within the network switches 1, 1'. From a first end-user 26, the audio component is shown passing through the network switch 1, across the network 27 to enter network switch 1' for onward transmission to second end-user 28.

In parallel, the network switch 1 directs the camera video signals to the 9.6 kbps codec 5 and V.32 modem 11 of the codec subsystem 2, through the network switch 1 and across the network 27 to be received by the complementary modem and codec equipments of codec subsystems 2'. Finally the video signal is presented to the monitor of the second end-user 28. Via the reciprocal route, video signals derived at the second end-user 28, are passed across the network 27 to the origin of the call (first end-user 26) for display. For each end-user, the distant camera may be manipulated by invoking the control unit 12 within the codec subsystem 2, using the telephone keypad (or similar) as the man-machine interface.

Figure 9:
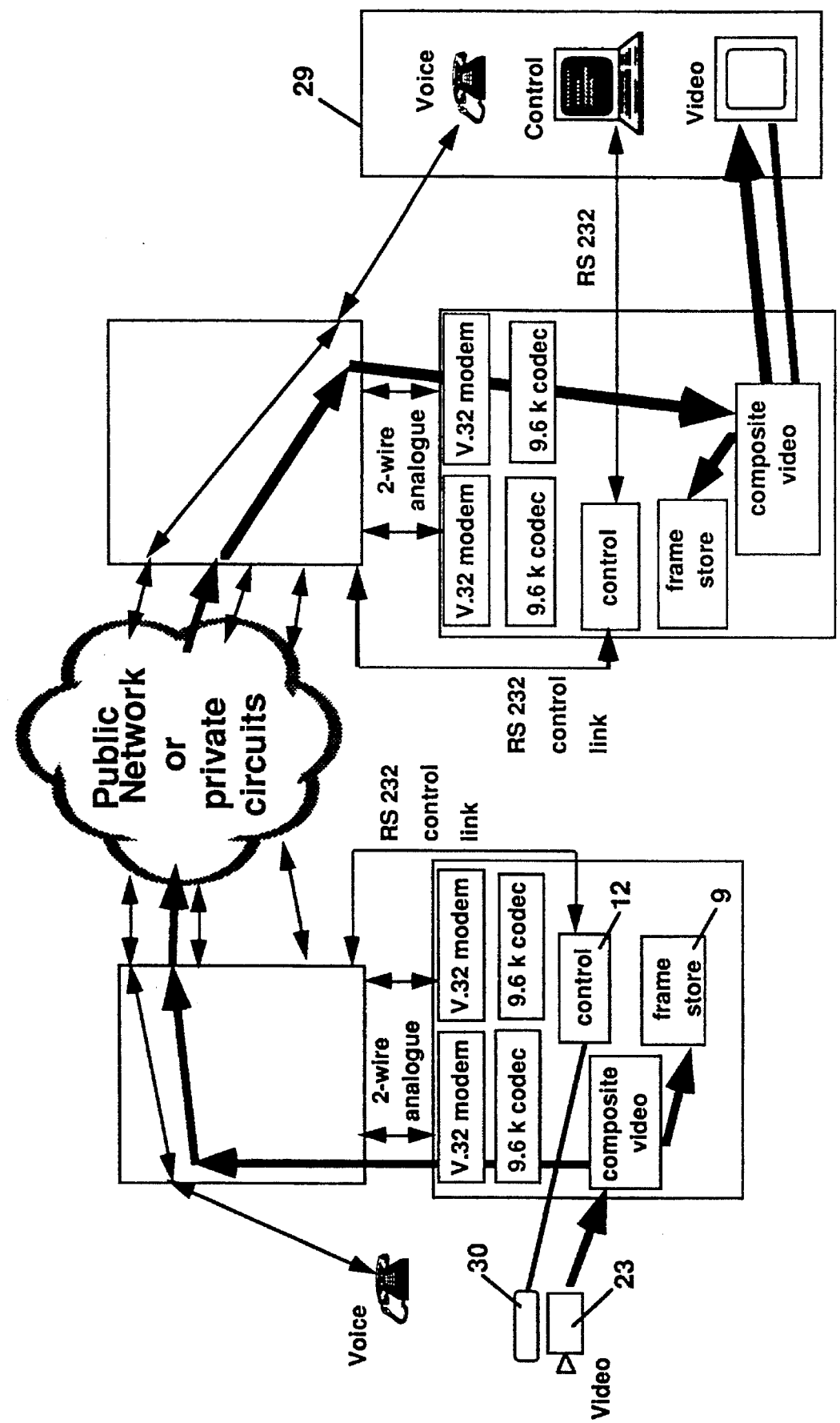
FIG. 9 illustrates a networked surveillance application in greater detail.

The system architecture of FIG. 8 can also be used for networked surveillance applications, one of which is illustrated in FIG. 9. The routing is similar to that of FIG. 8. The second end-user 28 of FIG. 8, however, becomes a central monitoring station 29. The central monitoring station 29 can control the cameras at the remote location (equivalent to the first end-user of FIG. 8) via the control processes (unit 12) within the codec subsystems and the associated RS232 links. In addition the codec subsystem can use an event sensor 30 to trigger the video camera 23 at the remote location. The associated frame store 9 can, also be used to store a history of the event as full resolution images captured when the event sensor 30 was triggered. The frame store 9 can be controlled from the central monitoring station 29 via the control process.

As will be appreciated from FIGS. 8 and 9 the systems illustrated therein use conventional PSTN or private circuit 2-wire analogue lines for transmission purposes and are thus readily achievable, although only low resolution images will be transferable due to these low bandwidth circuits. For higher resolution it will be necessary to use 2 B+D, multiples of 2 B+D, or 30 B+D as referred to above.

The system architecture described above provides a range of application support services which can be used to extend or enhance the desk-top services or the networked surveillance services. Some of the possible configurations are illustrated in FIGS. 10 to 13.

Figure 10:
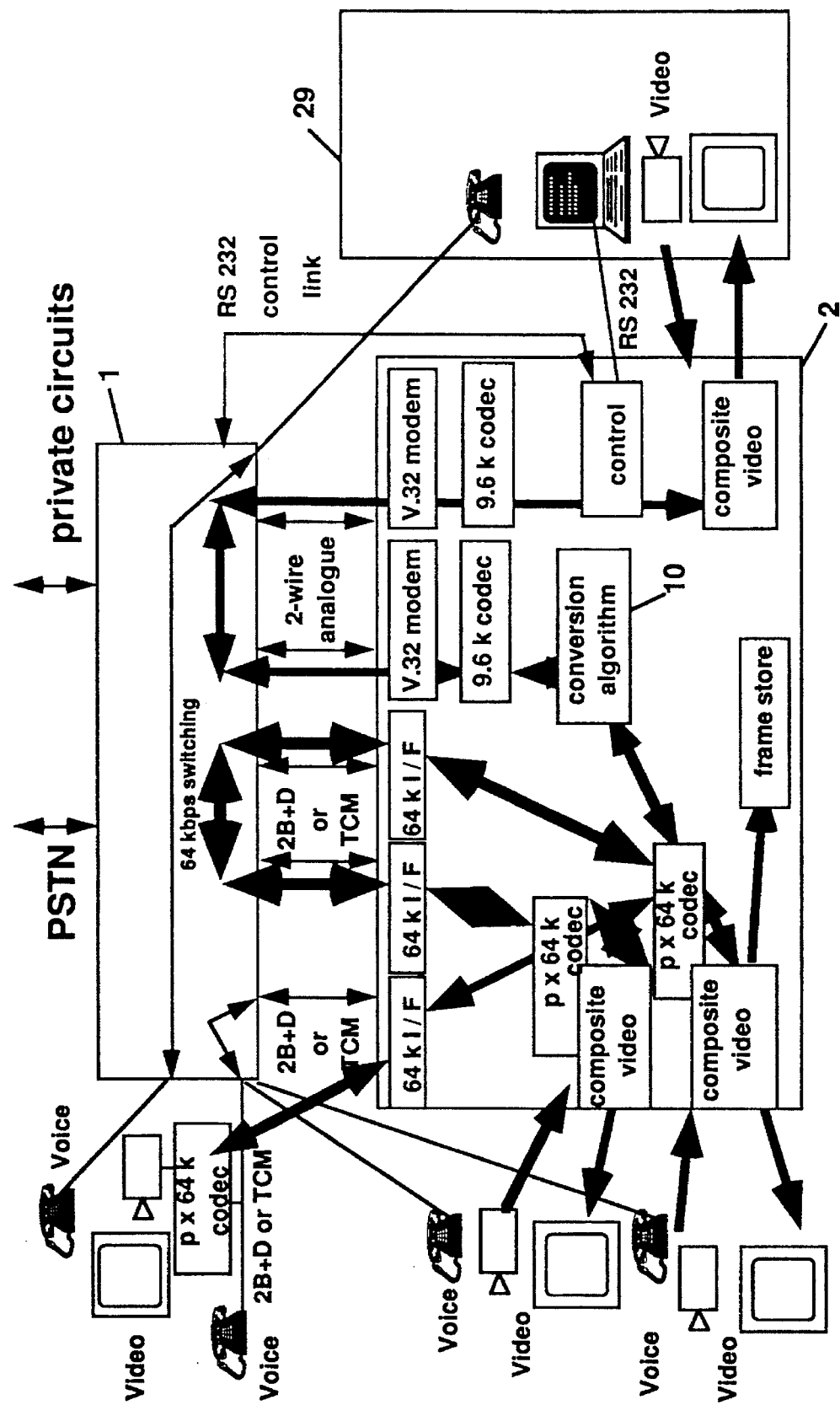
FIG. 10 illustrates a medium resolution desk-top application.

In the medium resolution desk-top application shown in FIG. 10, a conversion algorithm functional unit 10 is shown which provides interworking between video codecs running at different rates. For illustration, the figure shows conversion between 9.6 kbps and 64 kbps, although other conversion rates are possible.

Figure 11:
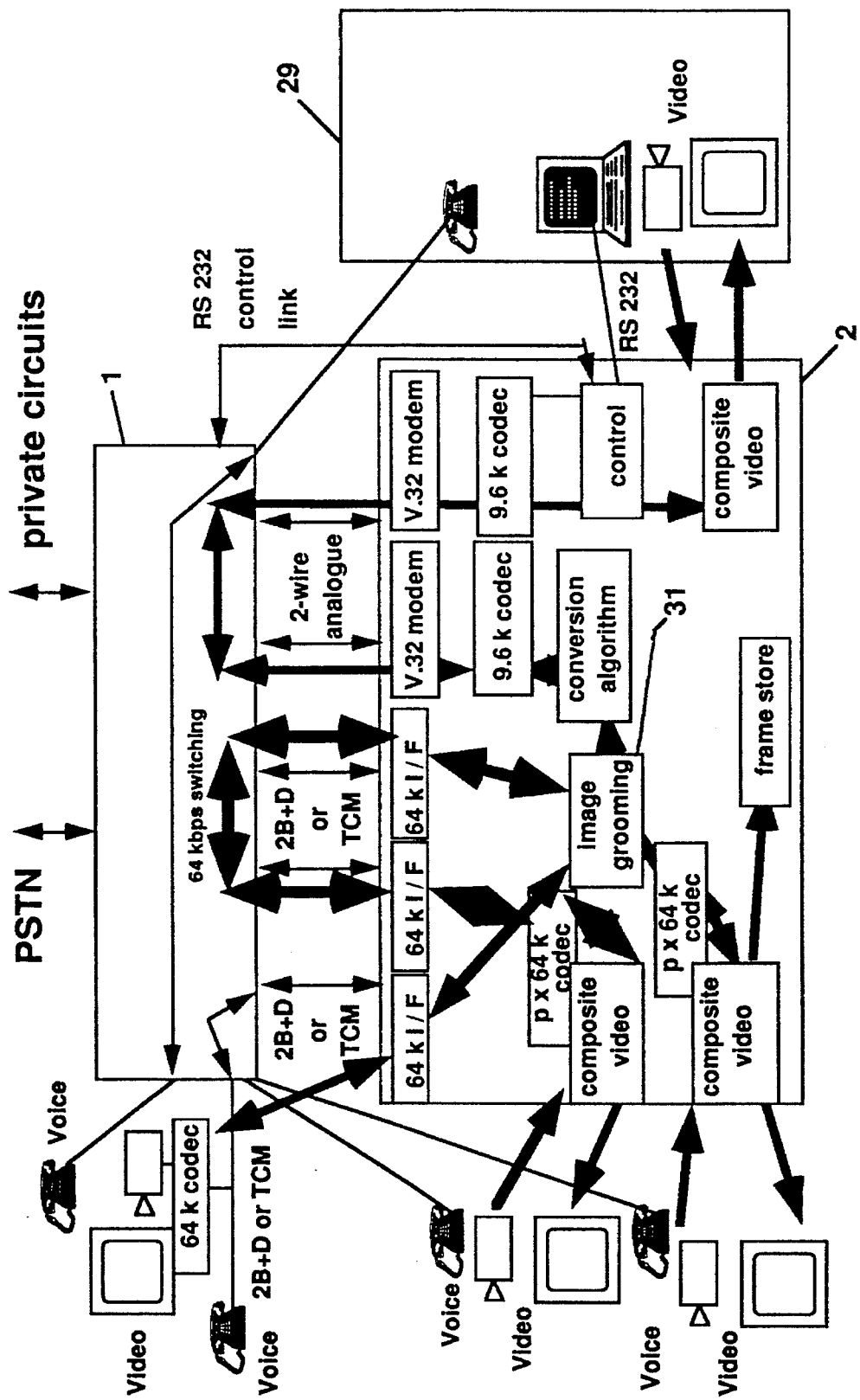
FIG. 11 illustrates an image grooming service.

In FIG. 11 an image grooming application is shown. The grooming function 31 provides a mechanism by which three major parameters defining the information content of a dynamic image can be selected dynamically and remotely. The parameters are spatial resolution (e.g. pixel density), intensity (e.g. grey levels) and refresh rate (e.g. frames per second). As an example, consider transmission of an image of black printing on white paper. The system has the ability to send 256 grey levels. However, the grooming function recognises that only black/white are concerned and switches the transmission to just that.

Figure 12:
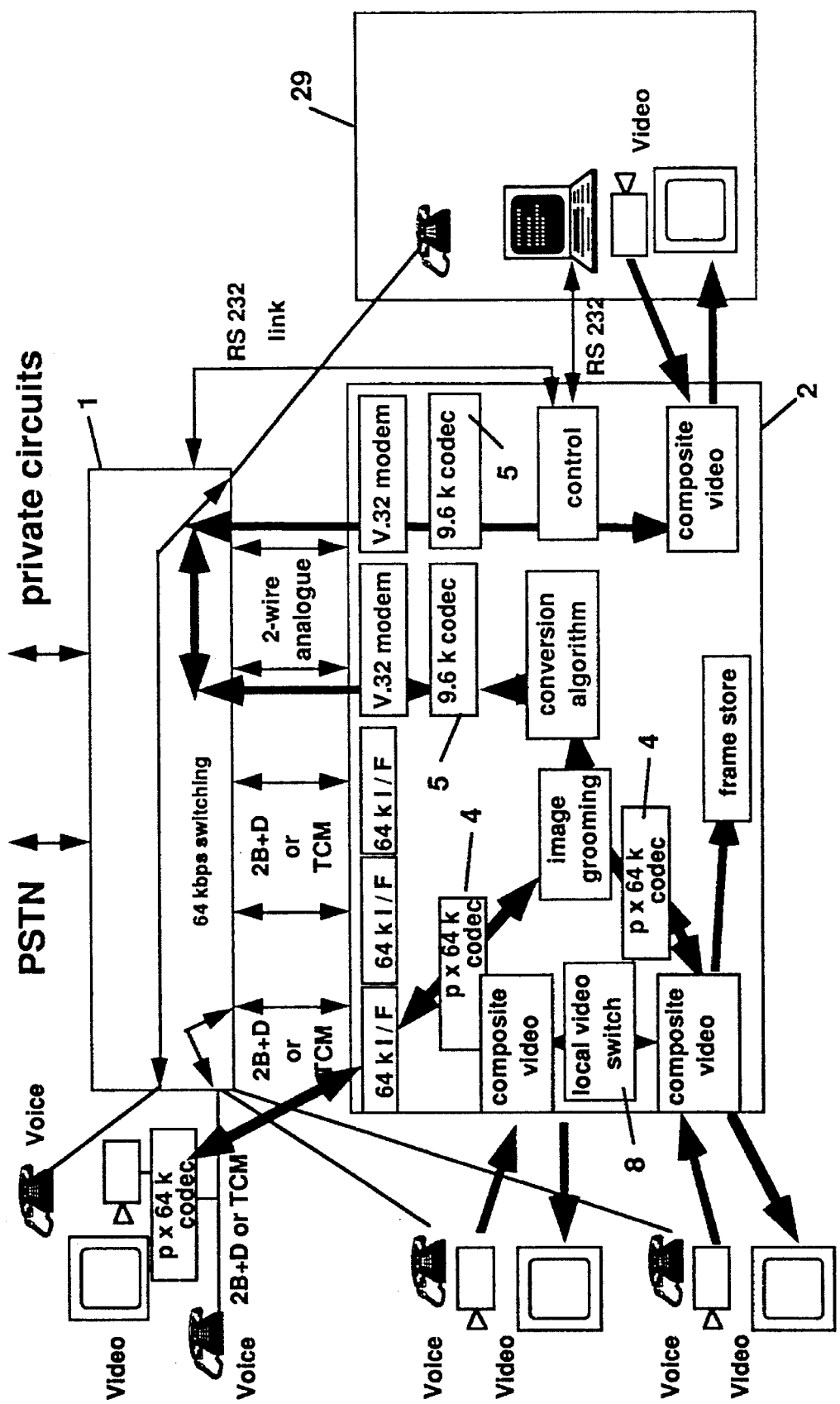
FIG. 12 illustrates a local video switching service.

In FIG. 12 a local video switching application is shown. The local video switch 8 allows composite video signals to be switched locally without going through the video codec pool (codecs 4 and 5 of subsystem 2). This function maintains the quality (high bandwidth) of the local analogue video signals and minimises system resource requirements.

In FIG. 13 an n×64 kbps switching application is shown. For many applications video codecs require data rates greater than 64 kbps yet must be switched through public networks which provide only 64 kbps switched circuits. The solution illustrated provides a phase aligner function 6 which provides end-to-end alignment of multiple 64 kbps circuits through a 30 B+D interface.

In summary, therefore, the invention provides a dial-up aural and visual communications system in which a codec subsystem is shared between a plurality of end users. The codec subsystem is connected between the end user's video equipment and a switch via which a telecommunications network (PSTN or private) can be accessed. Voice communications are connected via the switch in the usual manner. By sharing the codec between end users, costs and the amount of equipment required, for example, at an end user's desk are minimised. The codec subsystem can be considered as a video line card and can include various different elements in dependence on the required functioning, and will be interconnected with the switch in the corresponding manner, as described above with reference to FIG. 1, for example.

We claim:

1. An aural and visual (video) communications system, including a telecommunications network, a telecommunications switch coupled to the network, a codec subsystem or pool located at and coupled to the switch, and a plurality of user terminals coupled to the switch, each said user terminal having voice and visual communication facilities, wherein said user voice facilities are coupled each directly to the switch such as to provide access to the network via the switch for aural communication between said user terminals, wherein said user visual communication facilities are connected each via a respective land line to the codec subsystem, wherein the codec subsystem comprises a plurality of codecs of different bit rates each having an input coupled to said user visual communication facilities and an output which can be accessed by any of the user terminals so as to provide a corresponding video service for that user terminal, wherein said codec subsystem includes means for the storage of video images, said storage means having an input coupled to the visual communication facilities and an output which can be coupled to the input of said codec, wherein said codec subsystem serves to interface broadband video communication between local lines coupled to the switch, and wherein the codec subsystem includes a local video switch coupled to said switch and accessible from said user terminals for enabling said broadband video communication between said user terminals.

2. A system as claimed in claim 1, wherein the codec subsystem includes said codec operating at 9.6 kbps.

3. A system as claimed in claim 2 wherein the codec sub system is connected to the telecommunications switch by 2-wire analogue circuits and RS232 links via the 9.6 kbps codec whose output is coupled to an input of a V32 modem having an output coupled to said analogue circuits and links.

4. A system as claimed in claim 4 wherein the storage means comprises a frame store for composite video images.

5. A system as claimed in claim 1 wherein the codec subsystem is connected to the telecommunications switch via 2B+D lines or a high speed data module (HSDM).

6. A system as claimed in claim 5 wherein the codec subsystem further includes a p×64 kbps codec, p being a positive integer, and wherein the p×64 kbps codec has an input coupled to the user visual communication facilities and an output coupled to the telecommunications switch.

7. A system as claimed in claim 1 and where bandwidth conversion means having an input and output respectively coupled in use to a first and second said user terminals.

8. A system as claimed in claim 1 wherein visual communication is achieved with concurrent aural communication.

9. A system as claimed in claim 1 wherein visual communication is achieved without concurrent aural communication.

10. A subsystem as claimed in claim 1 wherein a further telecommunications switch is connected to the network and a respective codec subsystem is connected to the further switch such that communications between end users of both telecommunications switches are achievable.

* * * * *